United States Patent [19]

Ho

[11] 4,005,938
[45] Feb. 1, 1977

[54] HORIZON INDICATING DEVICE FOR MARINE SEXTANT

[76] Inventor: Shiaw-Lei Ho, No. 32, Lane 40, Tai Sheng St., Taipei, China /Taiwan

[22] Filed: Sept. 5, 1975

[21] Appl. No.: 610,866

[52] U.S. Cl. ............................ 356/149; 33/283; 356/250
[51] Int. Cl.[2] ........................................ G01C 15/14
[58] Field of Search .......... 356/148, 149, 248, 250, 356/249; 33/283

[56] References Cited

UNITED STATES PATENTS

| 269,486 | 12/1882 | Tennent | 356/149 |
| 544,212 | 8/1895 | Croskery | 356/149 |
| 1,891,641 | 12/1932 | Habel | 356/250 |

FOREIGN PATENTS OR APPLICATIONS

| 1,845 | 7/1860 | United Kingdom | 356/149 |
| 13,320 | 6/1912 | United Kingdom | 356/248 |

Primary Examiner—John K. Corbin
Assistant Examiner—Richard A. Rosenberger
Attorney, Agent, or Firm—Burns, Doane, Swecker & Mathis

[57] ABSTRACT

A horizon indicating device adapted to be mounted behind the horizon glass of a conventional marine sextant, comprising a wire indicator which is kept always in a horizontal position with two sets of pivotal axis forming a two dimensional universal support to cope with a rolling and pitching ship. The said device enables the sextant to function normally under poor visibility when the real horizon can not be seen. The self-illuminated wire indicator makes the sextant being able also to work during night time.

5 Claims, 8 Drawing Figures

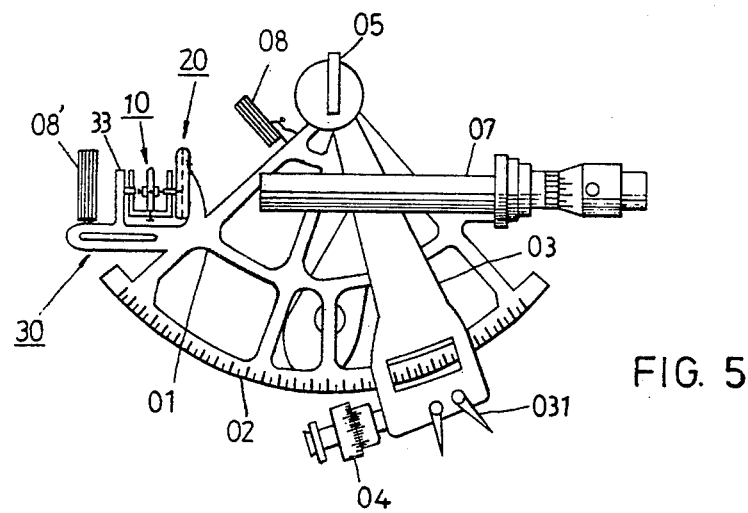
FIG. 5
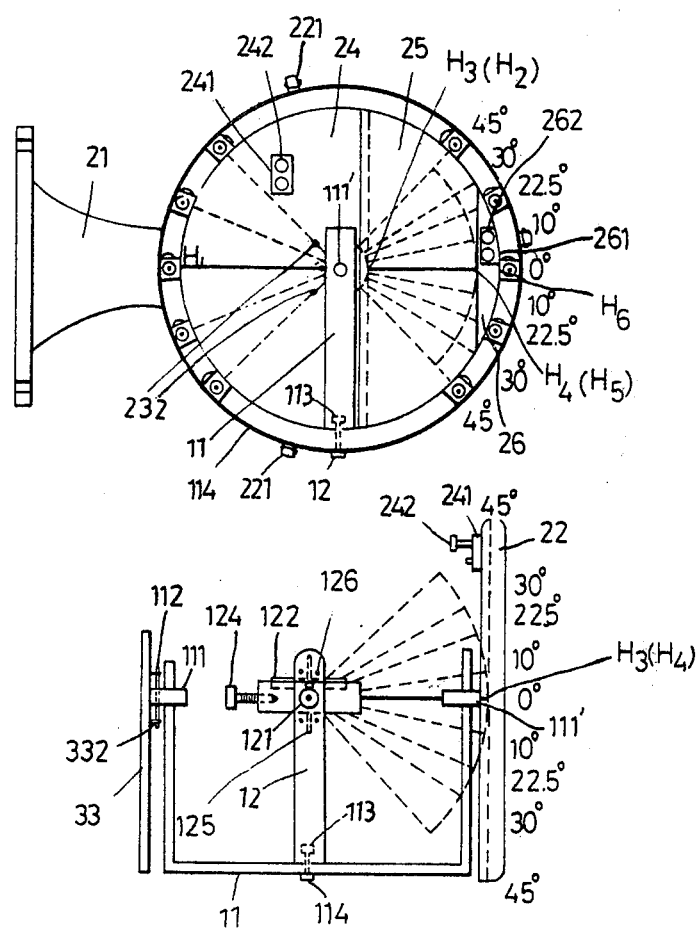
FIG. 7
FIG. 8

| SHIP CONDITION / OBSERVATION | SIMPLE | | | | COMBINATION | | | | NORMAL |
|---|---|---|---|---|---|---|---|---|---|
| | PITCHING | | ROLLING | | OF (A)&(C) | OF (A)&(D) | OF (B)&(C) | OF (B)&(D) | |
| | by stern (A) | by head (B) | over port (C) | over starboard (D) | | | | | |
| LOOKING FORWARD | | | | | | | | | |
| LOOKING STERNWARD | | | | | | | | | |
| PORT-WARD | | | | | | | | | |
| STARBOARD-WARD | | | | | | | | | |

HORIZON INDICATING DEVICE FOR MARINE SEXTANT

FIELD OF THE INVENTION

The present invention relates generally to marine sextants and more particularly to a horizon indicating device for sextants adapted to be mounted behind the horizon glass of a conventional sextant comprising a wire indicator which is kept always in a horizontal position by being ridden on a two dimensional universal pivotal support to cope with a rolling and pitching ship.

The said device enables the sextant to function properly under poor visibility, such as in a fog when the real horizon cannot be made clear. Being self-illuminated, the wire indicator would provide service during night time.

Sextant is an instrument that measures the angular distance between any two points, such as a celestial body and the horizon. Navigators use it to determine the position of their ships.

The frame of a sextant supports the graduated arc of a sixth part of a circle, two mirrors, and a small telescope. One mirror is fixed and is known as the horizon glass. The second mirror is screwed to the movable arm, or index bar, and is called the index mirror. The telescope sharpens the line of real horizon.

The sextant is held so that the arc is vertical and the horizon shown in the horizon glass. The operator looks through the telescope at the horizon glass. Then he moves the index arm until the image of a celestial body such as the sum or a certain star, reflected in the index mirror, touches the horizon line. The altitude of sun or star may be read from the graduated arc. The navigator then compares this altitude with computed altitude and gets a positien line.

In the above case, the sextant can only be used when the real horizon is clearly visible, because the horizon is taken as a reference of the measurement. Under a foggy weather, or during the dark night, the visibility approaches zero, the sextant cannot function properly. Besides, on a rough sea, the ship tends to roll as a combination effect of being pitched by the head or stern and rolled to lean over to port or starboard. It is therefore, in a modified type of sextant, a bubble is being provided at the object piece of the telescope to indicate the horizon. However, this kind of sextant can cope with only a 5° rolling and an auxiliary light shall have to be provided to illuminate the bubble.

The radio sextant or other electronic navigational equipment which receives the signal dispatched by stations ashore or satellites to aid the navigation is quite convenient, yet it is very expensive and requires skilled people to operate. In addition, during wartime, the wave length of signal sometimes has to be changed, so that the non-allied ship would not have a chance to utilise the service. The accuracy of radio navigation is no better than a common sextant.

SUMMARY OF INVENTION

Therefore the main object of the present invention is to provide a horizon indicating device for a sextant, comprising a self-illuminated wire ridden on a two dimensional universal support to cope with the rough sea condition and servicable during dark night and foggy weather when the real horizon cannot be made clear.

Another object of the present invention is that it is cheap to arrange the present invention and uses it instead of the old horizon device. So it is more economical.

Still another object of the present invention is that it is much safer to use the present invention for safety (a) for invisibility due to fog, etc., (b) when the ship is rolling or pitching, (c) during war time when the ship is attacked by aircraft or submarine.

Other objects and features of the present invention will become apparent from the following detailed description to be taken in conjunction with the annexed drawings.

BRIEF DESCRIPTION OF DRAWINGS

FIG. 5 depicts a modified sextant with device of the present invention mounted thereon.

FIG. 7 is a front view showing the swinging of the longitudinal or the first U bracket within ± 45°;

FIG. 8 is a side elevation showing the swinging of the bubble level-indicating wire assembly within ± 45°.

DETAIL DESCRIPTION

Figure 1:
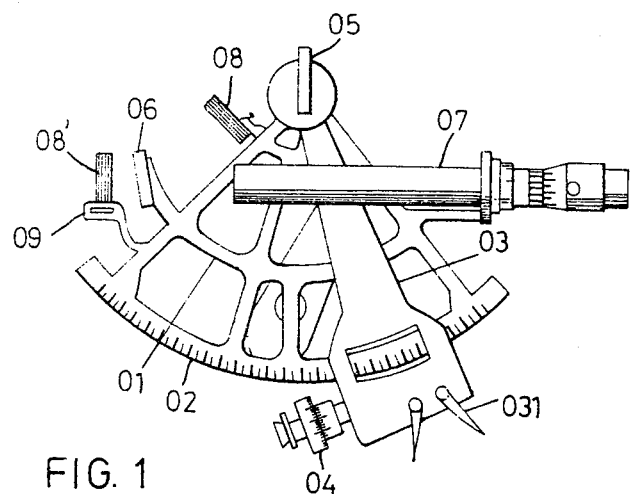
FIG. 1 depicts a conventional marine sextant with main parts illustrated.

A conventional marine sextant as shown in FIG. 1 comprises a frame 01 which supports the graduated arc 02 and a small telescope 07. A horizon glass, or mirror 06 is fixed on the frame near the object piece end of the telescope 07. An index mirror 05 is screwed to the movable arm, or index bar 03 which is movable along the arc 02 and having lock and release lever 031 and micrometer drum 04 provided to operate and make micro movement of the index bar 03. A shade 08 is placed between the index mirror 05 and the horizon glass 06. Another shade 08' is placed on arm 09 behind the horizon glass 06 to reduce the intensity of incident light. These shades can be removed when not in need.

Figure 2:
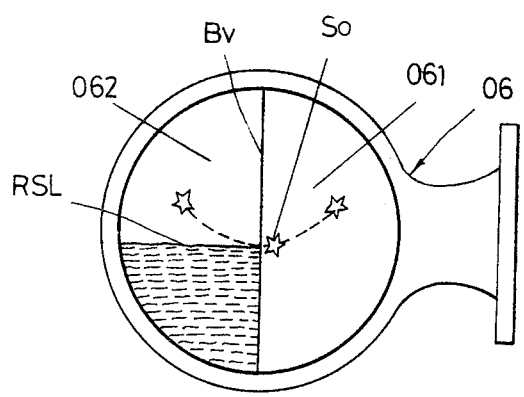
FIG. 2 shows the details of a conventional Horizon glass, and the measurement is being taken with a star as reference.

In FIG. 2, a horizon glass 06 of conventional type is shown. The glass 06 is bisected vertically into two sections, the right section 061 is a reflecting mirror while the left section 062 is a transparent glass which can see through to show the real horizon RSL. The image of a celestial body S is reflected from the index glass 05 to show on the section 061. In operation, the sextant is held upright to let the image of celestial body S to be fallen in the same vertical plane with the bisect line BV. The reading is taken when the image So is in touch with horizon RSL in a tangential manner. The dotted line arc shows the path of observer's swing of the sextant to catch the exact position. In recent designs, the whole horizon glass may be made of half-silvered mirror which could serve both as transparent glass and reflecting mirror, thus enables the measurement even easier.

Figure 3:
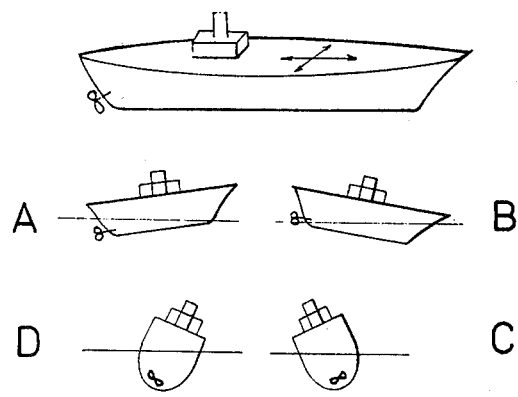
FIG. 3 depicts how a rolling ship would affect the use of a sextant.

FIG. 3 shows how the rolling and pitching of a ship affects the observation, the up-down movement would not give influence. However, when ship is pitched by stern or by the head (like A and B) and rolled over port or starboard (like C and D) is made the measurement difficult. Therefore, when a man-made horizon indicating device is considered, a two dimensional universal support shall be required. The present invention is designed to meet this requirement.

Someone put a bubble at the center of the object piece of the telescope to furnish a reference of horizon, yet the free flowing of the bubble makes the observation difficult. Besides, usually such kind of instrument gives only 5° angle flexibility which cannot cope with the actual requirement.

Figure 4:
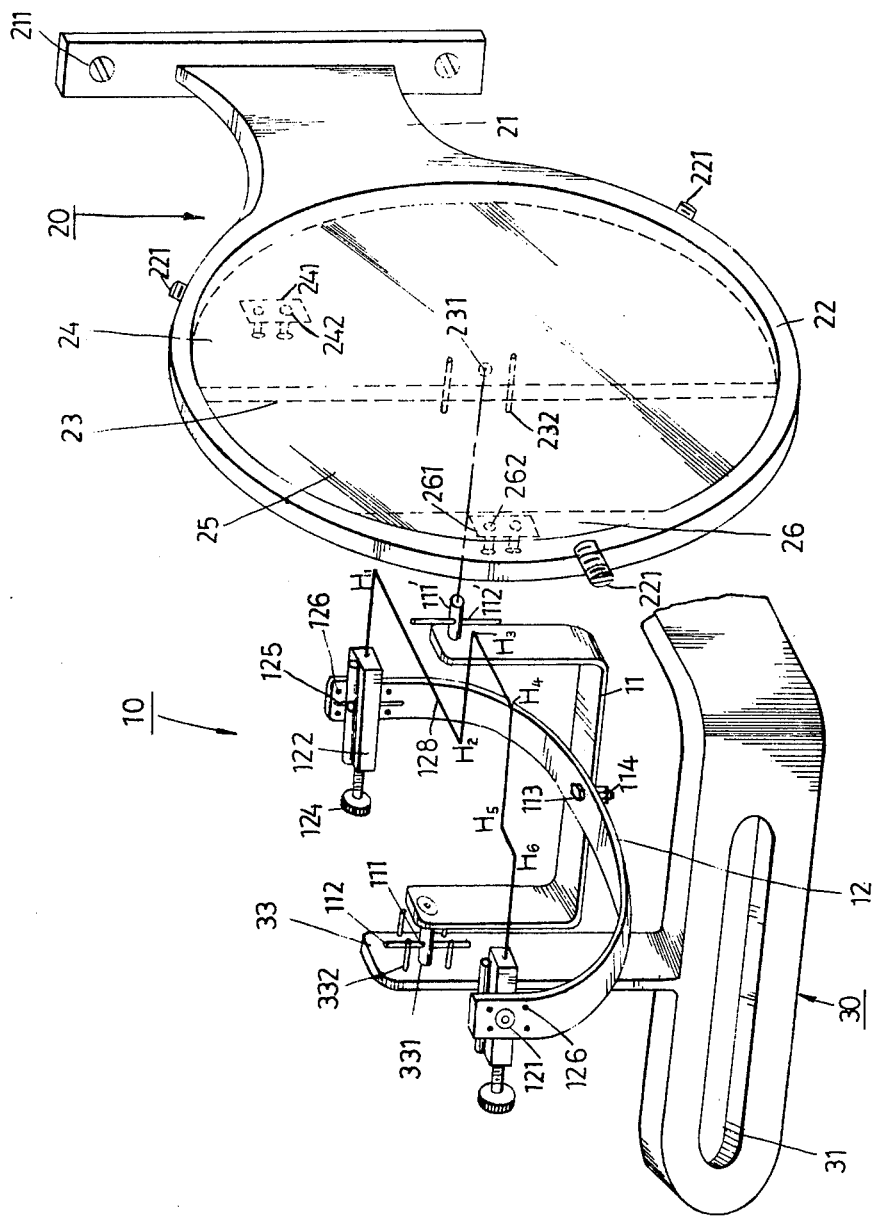
FIG. 4 is a perspective view showing the detailed construction of an embodiment of the present invention.

FIG. 4 illustrates the detailed construction of the present invention. The horizon indicating device 10 comprises two U shaped brackets: the first or longitudinal bracket 11 and the second or transverse bracket 12, crossed at right angle and fixed together with bolt-nut set 113—114 at their bottoms, which could be adjusted when necessary. The first U bracket 11 is disposed along the extension of the longitudinal axis of the telescope 07 with its two up right ends mounted respectively by pivot 111 to a vertical support 33 standing integrally on arm 30 (corresponding to arm 09 in FIG. 1 but extended lengthwise forward) through pivot hole 331, and pivot 111' to the center hole 231 of a modified horizon glass assembly 20 (corresponding to horizon glass 06 in FIG. 1). The second U bracket 12 has pivots 121—121 on both upright ends. Upon each pivot 121, a bubble level-indicating wire assembly 122 is mounted. At the front end of level assembly 122, a balance screw 124 is provided to counter balance the weight exerted to the rear of the assembly by a horizon indicating wire member 128 having zigzag formation $H_1$-$H_2$-$H_3$-$H_4$-$H_5$-$H_6$, wherein sections $H_1$-$H_2$ and $H_5$-$H_6$ are recessed to avoid conflicting the parts protruded from front side 24 and 26 of the horizon glass assembly and section $H_3$-$H_4$ are projected to be shown in the transparent part 25 of the horizon glass assembly 20.

The horizon glass assembly 20 has a metal ring frame 22 of considerable thickness with its base 21 formed integrally. The base 21 is fastened to the main frame (01 in FIG. 1) of the sextant with screws 211. Around the ring 22, holding screws 221 are provided to hold tight the glass inserted within the ring 22. Within the ring 22, at right side, a reflecting glass 24 is provided (corresponding to 061 of FIG. 2) which occupies an area more than half circle. Glass 24 is backed with a metal plate 23 to provide the mounting hole 231 at center of the ring and vertical adjustment plate 241 for the glass with adjusting screws 242 on it. Extending from the reflecting glass is a transparent portion 25. Further on toward the left side within the ring 22, is a small section 26, which is also a metal plate. Vertical adjustment 261–262 similar to 241–242 is provided thereon.

On pivots 111, 111' of the first U bracket 11, vertical pins 112, 112' are provided. Further on support 33, studs 332 and at the edge of plate 23, studs 232 are provided to serve as stoppers to the swinging of the bracket to limit the angle of swing to ± 45°. The pins 125 welded to the bubble level 122 and studs 126 on upper end of the second U bracket 12 serve the same purpose to limit the angle of swing of the bubble level-wire indicator assembly 122 to within ± 45°. The swing angle here provided is very much improved.

The extended slot hole 31 on arm 30 is for the mounting of shade 08' which is not shown in FIG. 4 for simplicity.

By being so arranged, the horizon indicating device is mounted on the sextant as shown in FIG. 5. The two U shaped brackets with indicating wire so mounted are free to cope with the rolling and pitching condition of the ship by the two dimensional universal system formed by pivots 111-111' and 121—121. The section $H_3$-$H_4$ of the horizon indicating wire 128 is painted with luminous paint to make it visible through the darkness and appears clearly in front of the transparent section 25 of the horizon glass. In case both section 24 and section 25 are made of half silvered mirror, then section $H_1$-$H_2$ of the indicating wire may also be painted luminous to extend the horizon to a full view. For better effect, section $H_5$-$H_6$ may also be luminous to enlarge the fields when the sextant is being used on a rough sea.

The device so constructed will let the horizon indicating wire simulate the real horizon which otherwise would unable to be seen when the visibility is poor because of bad weather or during dark night. Further, the two dimensional universal design facilitates the instrument to be able to operate on a rolling and pitching ship with ± 45° rolling and pitching.

On board a standstill ship on a calm sea, the device may be set up by first tightening the bolt-nut set 113–to fix the relative 90° cross position of the brackets 11 and 12. Then adjust screws 124 to see that bubble levels 122 are in horizontal position, the indicating wire 128 would naturally fall in a horizontal position.

FIG. 5 shows the device of the present invention being mounted as described before.

Figure 6:
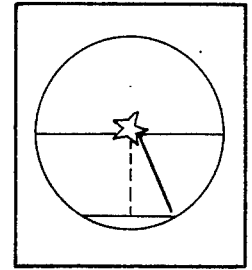
FIG. 6 is a diagram showing the various positions of the horizon indicator as seen toward various directions of the ship under the influences of rolling and pitching of the ship and combinations thereof.

FIG. 6 is a diagram showing the various positions of the horizon indicating wire as observed toward various directions of the ship under influences of rolling and pitching of ship and combinations thereof. The diagram is self-explanatory and one enlarged diagram is given to depict a measurement being taken when ship is in a combination of pitching by the head and rolling over starboard and observation made toward portside.

FIG. 7 shows the ± 45° swinging condition of the first U bracket, the recesses of $H_1$-$H_2$ and $H_5$-$H_6$ portion of the wire being avoided to conflict the protruded parts 241–242 and 261–262.

FIG. 8 shows the ± 45° swinging condition of the bubble level-indicating wire assembly, wherein enough space is provided in front of the glass to let the projected portion $H_3$-$H_4$ of the wire to swing freely and sufficient close to the glass surface without difficult.

The present invention gives an easy to do and inexpensive modification of the existing sextant while assures an effect to cope with observations on a rough sea and poor visibility. The accuracy is comparable to radio sextant, however, the investment is very much lower. Safety on sea would be benefited by such an invention.

The above embodiment is given only for illustration purpose and not by way of limitation, and modification will become evident to those skilled in the art which will fall within the scope of attached claims.

I claim:

1. In a marine sextant having a main frame carrying a telescope and a horizon glass, the improvement comprising means between said telescope and horizon glass for simulating a real horizon to compensate for poor visibility and rough seas, said horizon simulating means comprising:

a first U-shaped bracket having upwardly extending arms, a second U-shaped bracket having upwardly extending arms, the bottom portions of said first and second brackets being secured together, with said brackets arranged at 90° relative to one another;

said first U-shaped bracket having one of its arms pivotably mounted to the center of the horizon glass, and the other of its arms pivotably mounted to a vertically upstanding support on the main frame of the sextant, to define a first axis of rotation;

a pair of bubble level assemblies pivotably mounted to the arms of said second U-shaped bracket to define a second axis of rotation;

each bubble level assembly including a counterbalancing screw at one end;

a luminous wire of zig-zag shape having its ends mounted on said bubble level assemblies;

said wire being oriented to simulate a real horizon on said horizon glass when viewed through said telescope;

said wire being rotatable about said first and second axes of rotation to compensate for pitching and rolling movements of a ship.

2. Apparatus according to claim 1 wherein said first bracket carries a first vertical pin extending through said first axis, at least one of said upstanding support and said horizon glass including first stopper studs positioned adjacent said first axis to engage said first pin for limiting the swing angle of said first bracket to ± 45°.

3. Apparatus according to claim 1 wherein each bubble level assembly includes a sound vertical pin extending through said second axis, the arms of said second bracket each including second stopper studs positioned adjacent said second axis to engage said second pin for limiting the swing angle of said second bracket to ± 45°.

4. Apparatus according to claim 1 wherein said first bracket carries a first vertical pin extending through said first axis, at least one of said upstanding support and said horizon glass including first stopper studs positioned adjacent said first axis to engage said first pin for limiting the swing angle of said first bracket to ± 45°; each bubble level assembly including a second vertical pin extending through said second axis, the arms of said second bracket each including second stopper studs positioned adjacent said second axis to engage said second pin for limiting the swing angle of said second bracket to ± 45°; said wire including a projecting portion and recessed portions on opposite sides thereof spaced further from said horizon glass than said projecting portion.

5. Apparatus according to claim 4 wherein said horizon glass comprises a metal ring and integral base, said base being secured to the main frame of said sextant; said ring including holding screws for supporting a glass portion, said glass portion comprising a reflecting glass section occupying more than one-half of the area of said glass portion, a transparent glass section adjacent said reflecting glass section, and a metal plate covering an end of said transparent glass section which is remote from said reflecting glass section; said reflecting glass section being provided with a metal backing; said metal backing and said metal plate carrying adjustment means for varying the vertical positioning of said reflecting and transparent glass sections.

* * * * *